United States Patent
Yang et al.

(10) Patent No.: US 10,109,426 B2
(45) Date of Patent: Oct. 23, 2018

(54) FILM CAPACITOR

(71) Applicant: BYD COMPANY LIMITED, Shenzhen, Guangdong (CN)

(72) Inventors: Wei Yang, Guangdong (CN); Zhongzheng Liu, Guangdong (CN); Siyuan Liu, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/603,118

(22) Filed: May 23, 2017

(65) Prior Publication Data

US 2017/0256360 A1    Sep. 7, 2017

Related U.S. Application Data

(63) Continuation of application No. PCT/CN2015/095341, filed on Nov. 23, 2015.

(30) Foreign Application Priority Data

Nov. 28, 2014    (CN) ..................... 2014 2 0735558 U (51) Int. Cl.
*H01G 4/30* (2006.01)
*H01G 4/33* (2006.01)
(Continued)

(52) U.S. Cl.
CPC .............. *H01G 4/33* (2013.01); *H01G 4/224* (2013.01); *H01G 4/228* (2013.01); *H02G 5/00* (2013.01)

(58) Field of Classification Search
CPC .................................. H01G 4/228; H01G 4/38
(Continued)

(56) References Cited

U.S. PATENT DOCUMENTS 7,092,238 B2    8/2006    Saito et al.
2010/0000089 A1*    1/2010    Yang ..................... H01G 2/04
29/854
(Continued)

FOREIGN PATENT DOCUMENTS

CN    1714415    12/2005
CN    202384178 U    6/2012
(Continued)

OTHER PUBLICATIONS

International Search Report and Written Opinion for Application No. PCT/CN2015/095341, dated Mar. 1, 2016, 8 pages.

*Primary Examiner* — Eric Thomas (57) ABSTRACT

The present disclosure discloses a film capacitor, including: a capacitor core; a positive electrode busbar; a negative electrode busbar, superposed with and insulated from the positive electrode busbar; a first electrode terminal, connected to the positive electrode busbar; a second electrode terminal, connected to the negative electrode busbar; a first connection sheet connected to the positive electrode busbar and provided with a first connection terminal connected to the capacitor core; and a second connection sheet, opposed to the first connection sheet, connected to the negative electrode busbar and provided with a second connection terminal connected to the capacitor core, wherein the capacitor core is disposed between the first connection sheet and the second connection sheet; the first connection sheet, the first connection terminal and the positive electrode busbar are integrally formed; and the second connection sheet, the second connection terminal and the negative electrode busbar are integrally formed.

18 Claims, 3 Drawing Sheets

(51) Int. Cl.
*H01G 4/228* (2006.01)
*H01G 4/224* (2006.01)
*H02G 5/00* (2006.01)

(58) Field of Classification Search
USPC .......................................................... 361/329
See application file for complete search history.

(56) References Cited

U.S. PATENT DOCUMENTS

| | | | |
|---|---|---|---|
| 2010/0089641 A1* | 4/2010 | Esmaili | H05K 7/1432 |
| | | | 174/70 B |
| 2011/0149472 A1 | 6/2011 | Yang et al. | |
| 2011/0304948 A1 | 12/2011 | Lee et al. | |
| 2013/0335881 A1* | 12/2013 | Atsumi | H01G 11/74 |
| | | | 361/303 |

FOREIGN PATENT DOCUMENTS

| | | |
|---|---|---|
| CN | 204424090 U | 6/2015 |
| JP | 2010-225970 A | 10/2010 |
| WO | 2014/027720 A1 | 2/2014 |

* cited by examiner

FILM CAPACITOR

CROSS-REFERENCE TO RELATED APPLICATIONS

This application is a continuation application of International Application No. PCT/CN2015/095341, filed on Nov. 23, 2015, which is based on and claims priority to and benefits of Chinese Patent Application No. 201420735558.X, filed with the State Intellectual Property Office (SIPO) of the People's Republic of China on Nov. 28, 2014. The entire contents of the above-identified application are incorporated herein by reference.

FIELD

The present disclosure relates to a capacitor, and more particularly relates to a film capacitor.

BACKGROUND

A film capacitor such as a metalized film capacitor has characteristics like a low loss, a high voltage resistance, a good temperature characteristic and a good frequency characteristic.

Chinese patent CN1714415B discloses a metalized film capacitor. Two buses of the metallized film capacitor are connected to a capacitor core and oppositely disposed at both sides of the capacitor core. Chinese patent CN202384178U discloses a capacitor structure having an internal laminated busbar. The first and second busbars of the capacitor structure have L shapes and the bottoms of the first and second busbars are superposed together. Side walls of the two busbars are opposite to each other and provided with welding portions, and the welding portions are welded with the capacitor core respectively. In the capacitor described above, due to the design of the side wall of the busbar, the size and the number of the capacitor core are severely limited.

SUMMARY

The present disclosure aims to solve at least one of the above problems.

The present disclosure provides a film capacitor. The film capacitor is easy to be assembled and has a high assembling efficiency and quality and a low manufacturing cost.

The film capacitor according to embodiments of the present disclosure includes: a capacitor core; a positive electrode busbar; a negative electrode busbar, superposed with and insulated from the positive electrode busbar; a first electrode terminal, connected to the positive electrode busbar; a second electrode terminal, connected to the negative electrode busbar; a first connection sheet connected to the positive electrode busbar and provided with a first connection terminal connected to the capacitor core; and a second connection sheet, opposed to the first connection sheet, connected to the negative electrode busbar and provided with a second connection terminal connected to the capacitor core, wherein the capacitor core is disposed between the first connection sheet and the second connection sheet; the first connection sheet, the first connection terminal and the positive electrode busbar are integrally formed; and the second connection sheet, the second connection terminal and the negative electrode busbar are integrally formed.

With the film capacitor according to embodiments of the present disclosure, by providing a structure in which the positive electrode busbar and the negative electrode busbar are disposed within the casing, the first connection sheet connected to the positive electrode busbar and the second connection sheet connected to the negative electrode busbar are positioned at the two ends of the capacitor core respectively, the first connection sheet and the second connection sheet may be directly connected to the capacitor core in a welding manner, which is convenient for the welding automation, effectively improves the product quality and the manufacturing efficiency and reduces the cost.

In some embodiments, the film capacitor further includes a casing, in which the capacitor core, the positive electrode busbar, the negative electrode busbar, the first connection sheet and the second connection sheet are disposed within the casing and sealed by potting insulators.

In some embodiments, the film capacitor further includes an insulation sheet located between the positive electrode busbar and the negative electrode busbar.

In some embodiments, a plurality of the first connection terminals are provided, disposed at a peripheral edge of the first connection sheet and spaced apart from each other, and a plurality the second connection terminals is provided, disposed at a peripheral edge of the second connection sheet and spaced apart from each other.

In some embodiments, the first electrode terminal is connected to the positive electrode busbar by a rivet or a screw, the second electrode terminal is connected to the negative electrode busbar by a rivet or a screw.

In some embodiments, a plurality of first electrode terminals and a plurality of second electrode terminals are provided to form a plurality of pairs of electrode terminals, and the first electrode terminal is adjacent to the second electrode terminal in each pair.

In some embodiments, the second electrode terminal is connected to the negative electrode busbar via the second connection sheet.

In some embodiments, the insulation sheet has an L shape and comprises a short limb and a long limb, the positive electrode busbar is disposed on an outer surface of the long limb of the insulation sheet, the negative electrode busbar is disposed on an inner surface of the long limb of the insulation sheet.

In some embodiments, the positive electrode busbar comprises a first extending portion extended onto an outer surface of the short limb of the insulation sheet, the first electrode terminal is connected to the first extending portion, the second connection sheet includes a second extending portion extended onto the outer surface of the short limb of the insulation sheet and adjacent to the first extending portion, and the second electrode terminal is connected to the second extending portion.

In some embodiments, the first extending portion and the positive electrode busbar are integrally formed, and the second extending portion and the second connection sheet are integrally formed.

In some embodiments, the positive electrode busbar comprises a first extending portion extended onto an outer surface of the short limb of the insulation sheet, the first electrode terminal is connected to the first extending portion, the short limb of the insulation sheet defines a notch configured to expose a portion of the second connection sheet therefrom and adjacent to the first extending portion, the second electrode terminal is connected to the portion of the second connection sheet exposed from the notch.

In some embodiments, the first connection sheet is extended from an edge of a free end of the positive electrode busbar away from the short limb, the second connection sheet is extended from an edge of a free end of the negative electrode busbar adjacent to the short limb.

In some embodiments, the first connection sheet is parallel to the second connection sheet.

In some embodiments, each of the positive electrode busbar, the negative electrode busbar, the first connection sheet and the second connection sheet has a rectangle shape.

In some embodiments, a plurality of the first connection sheets are provided and spaced apart from each other in a length direction of the positive electrode busbar, a plurality of the second connection sheets are provided and spaced apart from each other in a length direction of the negative electrode busbar.

In some embodiments, the first connection sheet is perpendicularly connected to the positive electrode busbar, the second connection sheet is perpendicularly connected to the negative electrode busbar, and an axis of the capacitor core is arranged to be parallel to the positive electrode busbar and the negative electrode busbar.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

REFERENCE NUMERALS film capacitor 100;
casing 10;
positive electrode busbar 20; first electrode terminal 21; first connection sheet 22; first connection terminal 221; first extending portion 23;
negative electrode busbar 30; second electrode terminal 31; second connection sheet 32; second connection terminal 321; notch 322;
insulation sheet 40; short limb 41; long limb 42; capacitor core 50.

DETAILED DESCRIPTION

Reference will be made in detail to embodiments of the present disclosure, where the same or similar elements and the elements having the same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "length," "width," "thickness," "upper," "lower," "front," "rear," "left," "right," "vertical," "horizontal," "top," "bottom," "inner," and "outer" should be construed to refer to the orientation as then described or as shown in the drawings under discussion. These relative terms are for convenience of description and do not require that the present disclosure be constructed or operated in a particular orientation, thus shall not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means at least two, e.g. two, three and so on, unless specified otherwise.

In the description of the present disclosure, it should be understood that, unless specified or limited otherwise, the terms "mounted," "supported," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

A film capacitor 100 according to embodiments of the present disclosure will be described with reference to drawings.

As shown in FIGS. 1 to 6, the film capacitor 100 according to embodiments of the present disclosure may be used in an electric vehicle and includes: a casing 10, a plurality of capacitor cores 50, a positive electrode busbar 20, a negative electrode busbar 30, a first electrode terminal 21 connected to the positive electrode busbar 20, a second electrode terminal 31 connected to the negative electrode busbar 30, a first connection sheet 22 and a second connection sheet 32.

Specifically, the plurality of capacitor cores 50, the positive electrode busbar 20, the negative electrode busbar 30, the first connection sheet 22 and the second connection sheet 32 are disposed within the casing 10 and sealed by potting insulators, and the positive electrode busbar 20 and the negative electrode busbar 30 are superposed together and an insulation sheet 40 is provided between the positive electrode busbar 20 and the negative electrode busbar 30. The first connection sheet 22 and the second connection sheet 32 are opposed to each other and the capacitor core 50 is disposed between the first connection sheet 22 and the second connection sheet 32, the first connection sheet 22 is connected to the positive electrode busbar 20 and provided with a first connection terminal 221 connected to the capacitor core 50, and the second connection sheet 32 is connected to the negative electrode busbar 30 and provided with a second connection terminal 321 connected to the capacitor core 50.

Figure 1:
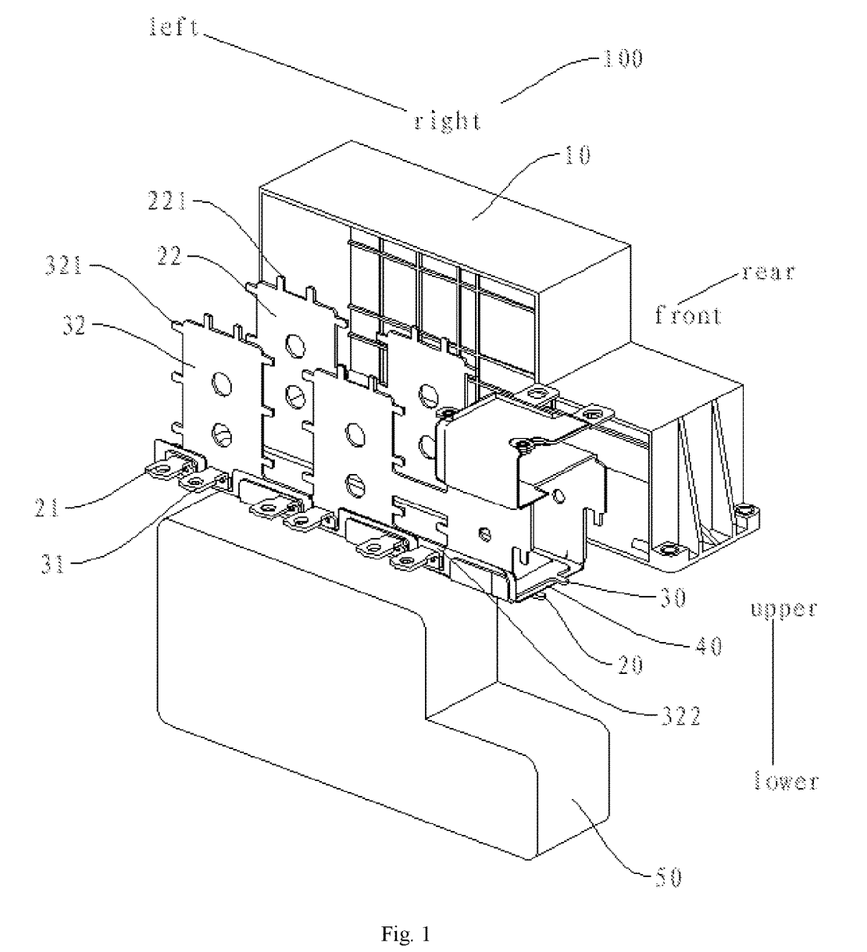
FIG. 1 is a schematic view of a film capacitor according to an embodiment of the present disclosure.

In other words, as shown in FIG. 1, the positive electrode busbar 20, the insulation sheet 40 and the negative electrode busbar 30 are superposed together and the insulation sheet 40 is provided between the positive electrode busbar 20 and the negative electrode busbar 30 to make the positive electrode busbar 20 and the negative electrode busbar 30 insulated from each other. The first connection sheet 22 may be perpendicularly connected to an edge of the positive electrode busbar 20, and the second connection sheet 32 may be perpendicularly connected to an edge of the negative electrode busbar 30. The capacitor core 50 is disposed between the first connection sheet 22 and the second connection sheet 32. That is, the positive electrode busbar 20, the negative electrode busbar 30 and the insulation sheet 40 are all disposed at a side surface of the capacitor core 50.

The positive electrode busbar 20 is provided with the first electrode terminal 21 and the negative electrode busbar 30 is provided with the second electrode terminal 31. The first electrode terminal 21 and the second electrode terminal 31 are connected to a connection terminal of an Insulated Gate Bipolar Transistor (IGBT) respectively. The first connection sheet 22 is provided with the first connection terminal 221, and the first connection terminal 221 is welded with a first end of the capacitor core 50. The second connection sheet 32 is provided with the second connection terminal 321, and the second connection terminal 321 is welded with a second end of the capacitor core 50.

Therefore, with the film capacitor 100 according to embodiments of the present disclosure, the positive electrode busbar 20 and the negative electrode busbar 30 are disposed within the casing 10, the first connection sheet 22 connected to the positive electrode busbar 20 and the second connection sheet 32 connected to the negative electrode busbar 30 are positioned at the two ends of the capacitor core 50 respectively. The first connection sheet 22 and the second connection sheet 32 may be directly connected to the capacitor core 50 in a welding manner, which is convenient for the welding automation, effectively improves the product quality and the manufacturing efficiency and reduces the cost. Since the negative electrode busbar 30, the positive electrode busbar 20 and the insulation sheet 40 are all located at the side surface of the capacitor core 50, inductances between the first electrode terminal 21 and the connection terminal of IGBT and between the second electrode terminal 31 and the connection terminal of IGBT can be effectively reduced.

According to an embodiment of the present disclosure, the first connection sheet 22, the first connection terminal 221 and the positive electrode busbar 20 are integrally formed; the second connection sheet 32, the second connection terminal 321 and the negative electrode busbar 30 are integrally formed.

In other words, the first connection sheet 22 is a portion of the positive electrode busbar 20, extended outwards from an edge of the positive electrode busbar 20 and perpendicular to the positive electrode busbar 20, and the first connection terminal 221 is a portion of the first connection sheet 22 and extended outwards from the first connection sheet 22. The second connection sheet 32 is a portion of the negative electrode busbar 30, extended outwards from an edge of the negative electrode busbar 30 and perpendicular to the negative electrode busbar 30, and the second connection terminal 321 is a portion of the second connection sheet 32 and extended outwards from the second connection sheet 32. Thus, the whole structural stability of the film capacitor 100 having this structure is ensured and the film capacitor 100 having this structure is easier to mold and assemble, which further reduces the manufacturing cost.

Figure 2:
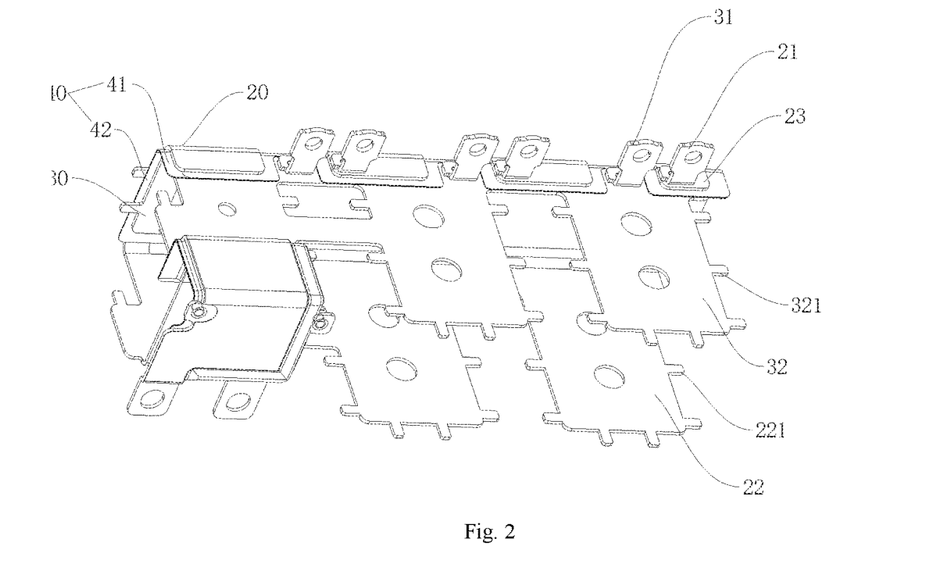
FIG. 2 is a schematic view of a positive electrode busbar and a negative electrode busbar according to an embodiment of the present disclosure.
Figure 3:
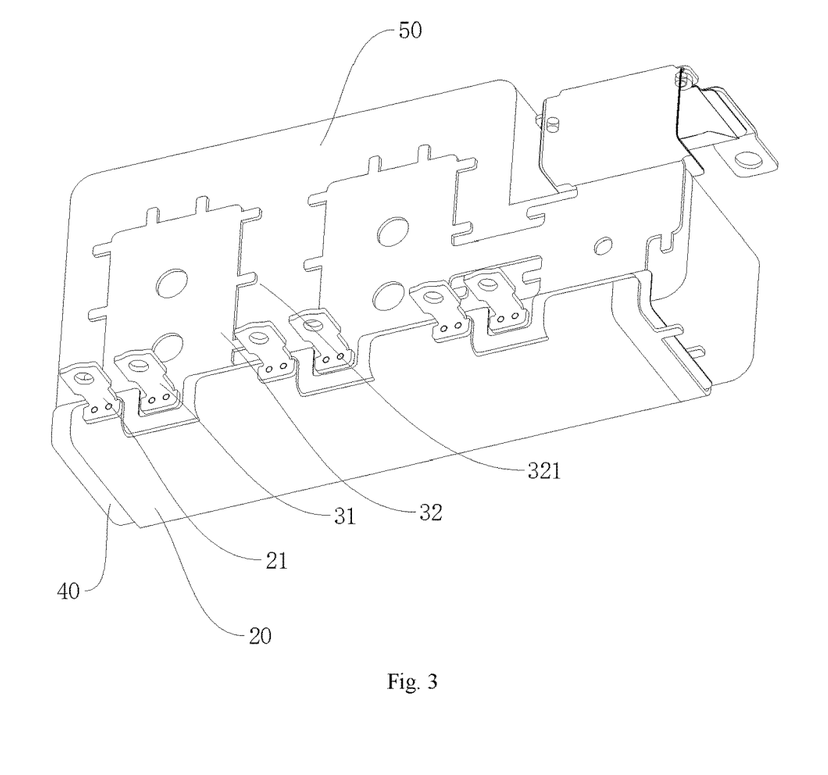
FIG. 3 is a partial schematic view of a film capacitor according to an embodiment of the present disclosure.
Figure 4:
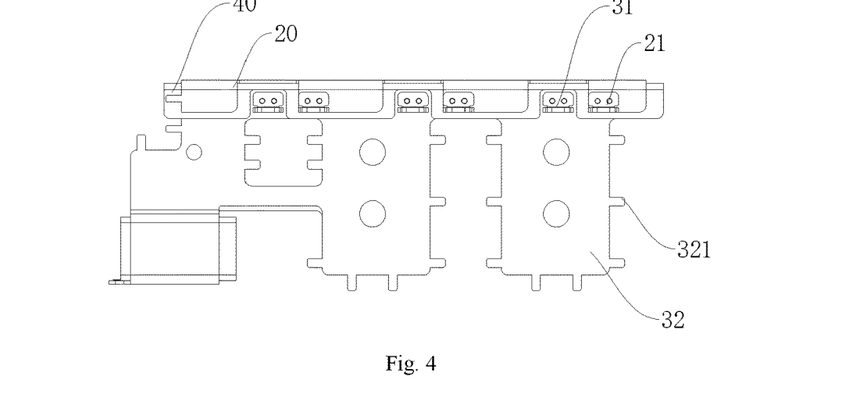
FIG. 4 is a top view of a positive electrode busbar and a negative electrode busbar according to an embodiment of the present disclosure as shown in FIG. 2.
Figure 5:
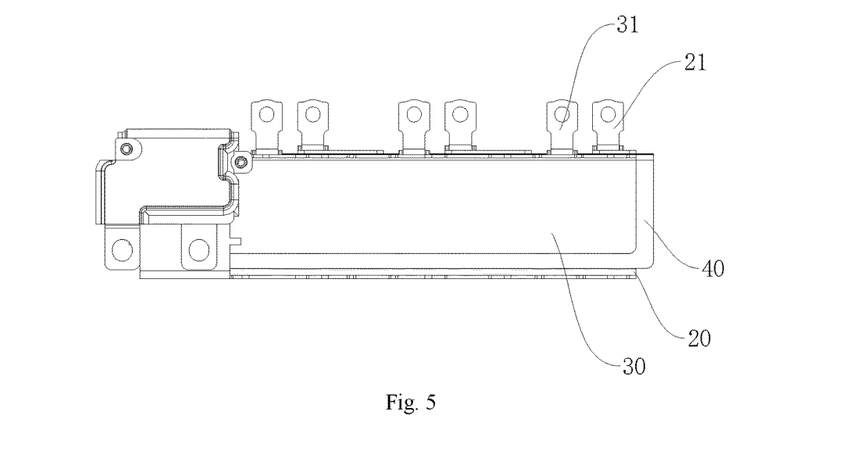
FIG. 5 is a front view of a positive electrode busbar and a negative electrode busbar according to an embodiment of the present disclosure as shown in FIG. 2.
Figure 6:
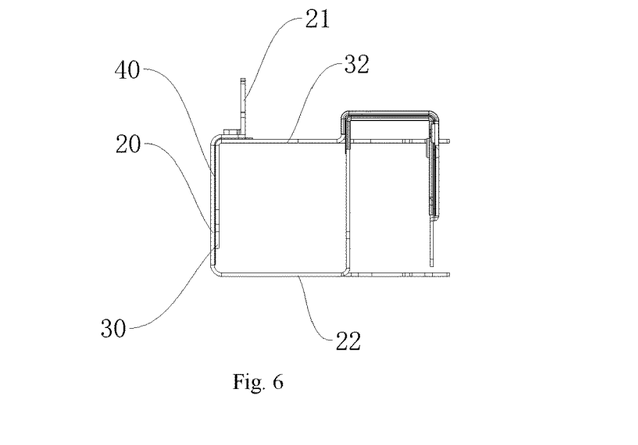
FIG. 6 is a side view of a positive electrode busbar and a negative electrode busbar according to an embodiment of the present disclosure as shown in FIG. 2.

As shown in FIGS. 2 and 3, according to an embodiment of the present disclosure, a plurality of first connection terminals 221 are provided, disposed at a peripheral edge of the first connection sheet 22 and spaced apart from each other. A plurality of second connection terminals 321 are provided, disposed at a peripheral edge of the second connection sheet 32 and spaced apart from each other.

In other words, the plurality of the first connection terminals 221 are disposed at the peripheral edge of the first connection sheet 22 and the plurality of the second connection terminals 321 are disposed at the peripheral edge of the second connection sheet 32. The plurality of first connection terminals 221 are spaced apart from each other at the peripheral edge of the first connection sheet 22 and the plurality of second connection terminals 321 are spaced apart from each other at the peripheral edge of the second connection sheet 32. Each of numbers of the first connection terminals 221 and the second connection terminals 321 may be corresponding to a number of the capacitor cores 50. Arrangement positions of the first connection terminals 221 on the first connection sheet 22 may be the same with those of the second connection terminals 321 on the second connection sheet 32, so that both ends of each capacitor core 50 can be connected to the corresponding first connection terminal 221 and second connection terminal 321.

In some embodiments of the present disclosure, the first electrode terminal 21 is connected to the positive electrode busbar 20 by a rivet or a screw, and the second electrode terminal 31 is connected to the negative electrode busbar 30 by a rivet or a screw. That is, the first electrode terminal 21 and the second electrode terminal 31 may be connected to the positive electrode busbar 20 and the negative electrode busbar 30 respectively by the rivet or the screw. Thus, this connection manner is simple and feasible, and convenient to operate.

When the plurality of the capacitor cores 50 are provided, the positive electrode busbar 20 and the negative electrode busbar 30 may be connected to IGBT via a plurality of the first electrode terminals 21 and a plurality of the second electrode terminals 31 respectively. Alternatively, as shown in FIG. 2, according to an embodiment of the present disclosure, the plurality of the first electrode terminals 21 and the plurality of the second electrode terminals 31 are provided to form a plurality of pairs of electrode terminals, and the first electrode terminal 21 is adjacent to the second electrode terminal 31 in each pair.

Specifically, the positive electrode busbar 20 is provided with the plurality of the first electrode terminals 21 in a length direction thereof and the negative electrode busbar 30 is provided with the plurality of the second electrode terminals 31 in a length direction thereof, in which each two adjacent electrode terminals, i.e., the first electrode terminal 21 and the second electrode terminal 31 arranged adjacent to the first electrode terminal 21, form a pair, and three pairs of the first electrode terminal 21 and the second electrode terminal 31 may be provided in the whole film capacitor 100 in the length directions of the positive electrode busbar 20 and negative electrode busbar 30. Thus, the positive electrode busbar 20 and the negative electrode busbar 30 are connected to IGBT via the plurality of the first electrode terminals 21 and the plurality of the second electrode terminals 31 respectively, which further reduces the inductances of the first electrode terminals 21 and the second electrode terminals 31.

In other embodiments of the present disclosure, the first electrode terminal 21 is connected to the positive electrode busbar 20, and the second electrode terminal 31 is connected to the negative electrode busbar 30 via the second connection sheet 32.

In other words, the first connection sheet 22 and the positive electrode busbar 20 may be integrally formed, the first connection sheet 22 is formed by bending a portion of the positive electrode busbar 20, and the first electrode terminal 21 is connected to the positive electrode busbar 20. Correspondingly, the second connection sheet 32 and the negative electrode busbar 30 may be integrally formed, and the second connection sheet 32 is formed by bending a portion of the negative electrode busbar 30. The second electrode terminal 31 is connected to the second connection sheet 32 so as to perform a connection with the negative electrode busbar 30. Therefore, the first electrode terminal 21 and the second electrode terminal 31 which having this structure further simplify their connections with the positive electrode busbar 20 and the negative electrode busbar 30, thus further simplifying the assembling procedure so as to improve the production efficiency.

The structure of each part of the film capacitor 100 according to embodiments of the present disclosure will be described in detail below.

As shown in FIG. 2, according to an embodiment of the present disclosure, the insulation sheet 40 has an L shape and includes a short limb 41 and a long limb 42. The positive electrode busbar 20 is disposed on an outer surface of the long limb 42 of the insulation sheet 40, and the negative electrode busbar 30 is disposed on an inner surface of the long limb 42 of the insulation sheet 40. It should be understood that, the outer surface of the insulation sheet 40 is referred to a wall surface of the insulation sheet 40 facing away from a side surface of the capacitor core 50 and the inner surface of the insulation sheet 40 is referred to a wall surface of the insulation sheet 40 facing to a side surface of the capacitor core 50.

In some specific embodiments of the present disclosure, the positive electrode busbar 20 includes a first extending portion 23 extended onto an outer surface of the short limb 41 of the insulation sheet 40, and the first electrode terminal 21 is connected to the first extending portion 23. The second connection sheet 32 includes a second extending portion extended onto the outer surface of the short limb 41 of the insulation sheet 40 and adjacent to the first extending portion 23, and the second electrode terminal 31 is connected to the second extending portion. Furthermore, the first connection sheet 22 is extended from an edge of a free end of the positive electrode busbar 20 away from the short limb 41, and the second connection sheet 32 is extended from an edge of a free end of the negative electrode busbar 30 adjacent to the short limb 41.

Preferably, according to an embodiment of the present disclosure, the first extending portion 23 and the positive electrode busbar 20 are integrally formed, and the second extending portion and the second connection sheet 32 are integrally formed. In other words, the first extending portion 23 is formed by extending a portion of the positive electrode busbar 20, and the second extending portion is formed by extending a portion of the second connection sheet 32.

In other words, the first connection sheet 22 is disposed at a rear edge of the positive electrode busbar 20 and perpendicular to the positive electrode busbar 20, and the first extending portion 23 is disposed at a front edge of the positive electrode busbar 20 and perpendicular to the positive electrode busbar 20. The first extending portion 23 is attached to the outer surface of the short limb 41 of the insulation sheet 40. The first electrode terminal 21 is connected to the first extending portion 23.

The second connection sheet 32 is disposed at a front edge of the negative electrode busbar 30 and perpendicular to the negative electrode busbar 30. The second connection sheet 32 is disposed in rear of the short limb 41 of the insulation sheet 40 and at least a portion of the second connection sheet 32 is extended upwards beyond an upper surface of the insulation sheet 40 so as to form the second extending portion. The second electrode terminal 31 is connected to the second extending portion. Thus, the insulation sheet 40 has a reasonable structure, so that it is convenient for the first connection terminal 221 and the second connection terminal 321 to connect to the positive electrode busbar 20 and the negative electrode busbar 30 respectively.

As shown in FIG. 1, in other specific embodiments of the present disclosure, the positive electrode busbar 20 includes the first extending portion 23 extended onto the outer surface of the short limb 41 of the insulation sheet 40, and the first electrode terminal 21 is connected to the first extending portion 23. The short limb 41 of the insulation sheet 40 has a notch 322 configured to expose a portion of the second connection sheet 32 therefrom and adjacent to the first extending portion 23, and the second electrode terminal 31 is connected to the portion of the second connection sheet 32 exposed from the notch 322.

In other words, the first connection sheet 22 is disposed at the rear edge of the positive electrode busbar 20 and perpendicular to the positive electrode busbar 20, and the first extending portion 23 is disposed at the front edge of the positive electrode busbar 20 and perpendicular to the positive electrode busbar 20. The first extending portion 23 is attached to the outer surface of the short limb 41 of the insulation sheet 40. The first electrode terminal 21 is connected to the first extending portion 23.

The second connection sheet 32 is disposed at the front edge of the negative electrode busbar 30 and perpendicular to the negative electrode busbar 30. The second connection sheet 32 is disposed in rear of the short limb 41 of the insulation sheet 40. The short limb 41 of the insulation sheet 40 has the notch 322 configured to expose the portion of the second connection sheet 32 therefrom and adjacent to the first extending portion 23, so that the second electrode terminal 31 can be arranged adjacent to the corresponding first electrode terminal 21. Thus, by providing the notch 322 in the short limb 41 of the insulation sheet 40, it is more convenient for the second electrode terminal 31 to be connected to the negative electrode busbar 30, which further simplifies the assembling process of the film capacitor 100 and improves the assembly efficiency.

A shape of each part of the film capacitor 100 may be reasonably adjusted based on an environment in which it is required to be used. Alternatively, each of the positive electrode busbar 20, the negative electrode busbar 30, the first connection sheet 22 and the second connection sheet 32 has a rectangle shape. Furthermore, a plurality of the first connection sheets 22 are provided and spaced apart from each other in the length direction of the positive electrode busbar 20, and a plurality of the second connection sheets 32 are provided and spaced apart from each other in the length direction of the negative electrode busbar 30.

Other structures and operations of the film capacitor 100 according to embodiments of the present disclosure are known to those skilled in the art, and thus will not be described in detail here.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure.

Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A film capacitor, comprising:
   a capacitor core;
   a positive electrode busbar;
   a negative electrode busbar, superposed with and insulated from the positive electrode busbar;
   an insulation sheet disposed between the positive electrode busbar and the negative electrode busbar, the insulation sheet having an L shape and comprising a short limb and a long limb, wherein the positive electrode busbar is disposed on an outer surface of the long limb of the insulation sheet, and the negative electrode busbar is disposed on an inner surface of the long limb of the insulation sheet;
   a first electrode terminal, connected to the positive electrode busbar;
   a second electrode terminal, connected to the negative electrode busbar;
   a first connection sheet, connected to the positive electrode busbar and provided with a first connection terminal connected to the capacitor core; and
   a second connection sheet, opposed to the first connection sheet, connected to the negative electrode busbar and provided with a second connection terminal connected to the capacitor core,
   wherein the capacitor core is disposed between the first connection sheet and the second connection sheet; the first connection sheet, the first connection terminal and the positive electrode busbar are integrally formed; and the second connection sheet, the second connection terminal and the negative electrode busbar are integrally formed,
   wherein the positive electrode busbar comprises an extending portion extended onto an outer surface of the short limb of the insulation sheet, the first electrode terminal is connected to the extending portion, the short limb of the insulation sheet has a notch from which a portion of the second connection sheet is exposed, the notch being adjacent to the extending portion, and the second electrode terminal is connected to the portion of the second connection sheet exposed from the notch.

2. The film capacitor according to claim 1, further comprising a casing,
   wherein the capacitor core, the positive electrode busbar, the negative electrode busbar, the first connection sheet and the second connection sheet are disposed within the casing and sealed by potting insulators.

3. The film capacitor according to claim 1, wherein a plurality of the first connection terminals are disposed at a peripheral edge of the first connection sheet and spaced apart from each other, and a plurality of the second connection terminals are disposed at a peripheral edge of the second connection sheet and spaced apart from each other.

4. The film capacitor according to claim 1, wherein the first electrode terminal is connected to the extending portion of the positive electrode busbar by a rivet or a screw, the second electrode terminal is connected to the exposed portion of the the second connection sheet by a rivet or a screw.

5. The film capacitor according to claim 1, wherein a plurality of first electrode terminals and a plurality of second electrode terminals form a plurality of pairs of electrode terminals, and the first electrode terminal is adjacent to the second electrode terminal in each pair.

6. The film capacitor according to claim 1, wherein the extending portion and the positive electrode busbar are integrally formed.

7. The film capacitor according to claim 1, wherein the first connection sheet is extended from an edge of a free end of the positive electrode busbar away from the short limb, the second connection sheet is extended from an edge of a free end of the negative electrode busbar adjacent to the short limb.

8. The film capacitor according to claim 7, wherein the first connection sheet is parallel to the second connection sheet.

9. The film capacitor according to claim 1, wherein each of the positive electrode busbar, the negative electrode busbar, the first connection sheet and the second connection sheet has a rectangle shape.

10. The film capacitor according to claim 1, wherein a plurality of the first connection sheets are spaced apart from each other in a length direction of the positive electrode busbar, a plurality of the second connection sheets are spaced apart from each other in a length direction of the negative electrode busbar.

11. The film capacitor according to claim 1, wherein the first connection sheet is perpendicularly connected to the positive electrode busbar, the second connection sheet is perpendicularly connected to the negative electrode busbar, and an axis of the capacitor core is arranged to be parallel to the positive electrode busbar and the negative electrode busbar.

12. The film capacitor according to claim 1, wherein a part of the short limb of the insulation sheet is exposed along at least one edge of the extending portion.

13. The film capacitor according to claim 1, wherein a length of the notch in a length direction of the negative electrode busbar is shorter than a length of the second connection sheet in the length direction of the negative electrode busbar.

14. A film capacitor, comprising:
    a capacitor core;
    a positive electrode busbar;
    a negative electrode busbar;
    an insulation sheet disposed between the positive electrode busbar and the negative electrode busbar, the insulation sheet having an L shape and comprising a short limb and a long limb, wherein the positive electrode busbar is disposed on an outer surface of the long limb of the insulation sheet, and the negative electrode busbar is disposed on an inner surface of the long limb of the insulation sheet;
    a first electrode terminal, connected to the positive electrode busbar;
    a second electrode terminal, connected to the negative electrode busbar;
    a first connection sheet, connected to the positive electrode busbar and provided with a first connection terminal connected to the capacitor core; and
    a second connection sheet, opposed to the first connection sheet, connected to the negative electrode busbar and provided with a second connection terminal connected to the capacitor core, wherein the capacitor core is disposed between the first connection sheet and the second connection sheet, wherein the positive electrode busbar comprises an extending portion extended onto an outer surface of the short limb of the insulation sheet, the first electrode terminal is connected to the extending portion, the short limb of the insulation sheet has a notch from which a portion of the second connection sheet is exposed, the notch being adjacent to the extending portion, and the second electrode terminal is connected to the portion of the second connection sheet exposed from the notch.

15. The film capacitor according to claim 14, wherein the negative electrode busbar is superposed with and insulated from the positive electrode busbar.

16. The film capacitor according to claim 14, wherein the first connection sheet, the first connection terminal and the positive electrode busbar are integrally formed; and the second connection sheet, the second connection terminal and the negative electrode busbar are integrally formed.

17. The film capacitor according to claim 14, wherein a part of the short limb of the insulation sheet is exposed along at least one edge of the extending portion.

18. The film capacitor according to claim 14, wherein a length of the notch in a length direction of the negative electrode busbar is shorter than a length of the second connection sheet in the length direction of the negative electrode busbar.

* * * * *